United States Patent
Otala

(10) Patent No.: US 9,672,225 B2
(45) Date of Patent: Jun. 6, 2017

(54) MANAGEMENT OF THUMBNAIL DATA ASSOCIATED WITH DIGITAL ASSETS

(75) Inventor: Tapani Juha Otala, San Jose, CA (US)

(73) Assignee: Adobe Systems Incorporated, San Jose, CA (US)

(*) Notice: Subject to any disclaimer, the term of this patent is extended or adjusted under 35 U.S.C. 154(b) by 1199 days.

(21) Appl. No.: 12/830,800

(22) Filed: Jul. 6, 2010

(65) Prior Publication Data

US 2014/0289263 A1    Sep. 25, 2014

(51) Int. Cl.
*G06F 17/30* (2006.01)

(52) U.S. Cl.
CPC .... *G06F 17/30247* (2013.01); *G06F 17/3028* (2013.01)

(58) Field of Classification Search
CPC ................................... G06F 17/3028
See application file for complete search history.

(56) References Cited

U.S. PATENT DOCUMENTS

| | | | | |
|---|---|---|---|---|
| 5,682,441 | A * | 10/1997 | Ligtenberg et al. | 382/232 |
| 6,097,389 | A * | 8/2000 | Morris et al. | 715/804 |
| 6,215,523 | B1 * | 4/2001 | Anderson | 348/333.05 |
| 6,272,235 | B1 * | 8/2001 | Bacus et al. | 382/133 |
| 6,545,687 | B2 * | 4/2003 | Scott et al. | 345/629 |
| 2002/0000998 | A1 * | 1/2002 | Scott et al. | 345/667 |
| 2003/0080977 | A1 * | 5/2003 | Scott et al. | 345/629 |
| 2005/0019007 | A1 * | 1/2005 | Kato et al. | 386/69 |
| 2005/0041035 | A1 | 2/2005 | Nagatomo et al. | |
| 2005/0165840 | A1 * | 7/2005 | Pratt et al. | 707/104.1 |
| 2005/0262125 | A1 * | 11/2005 | Kanai | 707/101 |
| 2007/0203948 | A1 * | 8/2007 | Yoshida et al. | 707/104.1 |
| 2008/0034306 | A1 * | 2/2008 | Ording | 715/764 |
| 2008/0034325 | A1 * | 2/2008 | Ording | 715/838 |
| 2008/0129728 | A1 * | 6/2008 | Satoshi | 345/419 |
| 2008/0162528 | A1 * | 7/2008 | Jariwala | 707/102 |
| 2009/0091770 | A1 * | 4/2009 | Kano et al. | 358/1.1 |
| 2009/0285495 | A1 * | 11/2009 | Wagner | 382/232 |
| 2009/0303251 | A1 * | 12/2009 | Balogh et al. | 345/632 |
| 2009/0319897 | A1 * | 12/2009 | Kotler et al. | 715/711 |
| 2010/0111411 | A1 * | 5/2010 | Ernst et al. | 382/166 |

* cited by examiner

*Primary Examiner* — James Trujillo
*Assistant Examiner* — Hubert Cheung
(74) *Attorney, Agent, or Firm* — Kilpatrick Townsend & Stockton LLP

(57) ABSTRACT

According to example configurations, a digital asset manager receives a digital asset. The digital asset manager generates multiple sets of thumbnail data based on the digital asset. Each of the multiple sets of thumbnail data can be encoded to support display of a different thumbnail resolution of the digital asset. The digital asset manager initiates storage of the multiple sets of thumbnail data in a unit of storage of a repository. The unit of storage can be pre-allocated for storing the multiple sets of thumbnail data associated with the digital asset. Accordingly, in lieu of storing data for each thumbnail in a different file as in conventional methods, configurations herein can include storing thumbnail data in the same unit of storage or file. Thus, multiple sets of thumbnail data for a corresponding digital asset can be stored in a single file.

15 Claims, 9 Drawing Sheets

MANAGEMENT OF THUMBNAIL DATA ASSOCIATED WITH DIGITAL ASSETS

BACKGROUND

Many conventional software applications are configured to display thumbnail images (i.e., smaller sized images) in lieu of displaying full-sized images on a display screen. A benefit of rendering a thumbnail image in lieu of rendering a full-sized image is space saving on a display screen. For example, display of a full size image on a display screen may not be appropriate, especially if a user is not particularly interested in viewing the fill-sized image.

Typically, in response to selection of a displayed thumbnail on a display screen, a conventional computer initiates retrieval of data to render a full-sized version of the selected thumbnail. Accordingly, a user can selectively view higher resolution or larger sized images merely by clicking on a thumbnail in a web page, document, etc.

Use of Cascading Style Sheets (CSS) in web pages support a notion of "image sprites" in a read-use case. In general, image sprites have been used to reference multiple different images. In certain conventional cases, a web page may use an image sprite that contains graphical elements of the page. The image sprites enable efficient network transport and referencing of multiple images rather than referencing each image individually.

An image file format called Flashpix was developed to store an original image and corresponding smaller thumbnail data for rendering a thumbnail of the original image.

In contrast to Flashpix, yet another conventional web application includes individually storing an original image as well as individually storing each respective thumbnail image as different retrievable image files.

BRIEF DESCRIPTION

Conventional storage of thumbnail data suffers from a number of drawbacks. For example, conventional web applications can use multiple thumbnails, each of which supports a different display resolution when rendered on a display screen. However, management of thumbnail data associated with thumbnails can be tedious as modification or deletion of an original image results in the need to modify or delete multiple files of individually stored thumbnail data. In other words, upon deletion of a main image file, each separately stored thumbnail version file must be identified and deleted as well. Thus, deletion of a main image file can result in the need to delete many thumbnail files.

Embodiments herein deviate with the conventional storage of thumbnail data as discussed above. For example, one embodiment herein includes a digital asset manager. The digital asset manager receives a digital asset. The digital asset manager generates multiple sets of thumbnail data based on the digital asset. Each of the multiple sets of thumbnail data can be encoded to support display of a different rendering and/or resolution of the digital asset on a display screen. In one embodiment, the digital asset manager initiates storage of the multiple sets of thumbnail data in a unit of storage. The unit of storage such as a file can be pre-allocated for storing the multiple sets of thumbnail data associated with a respective digital asset. Accordingly, in lieu of storing data for each thumbnail for a digital asset in a different file as in conventional methods, embodiments herein include storing thumbnail data for a number of different renditions in the same unit of storage. In one embodiment, the unit of storage is a single file allocated to store the multiple sets of thumbnail data.

Note that the digital asset manager can be configured to manage thumbnails for each of multiple digital assets. For example, in one embodiment, the digital asset manager generates sets of thumbnail data for each of multiple digital assets. The digital asset manager stores a respective set of thumbnail data for each digital asset in a different file. Such an embodiment simplifies management of respective thumbnail data because each respective file of multiple different versions of thumbnail data for a respective digital asset can be managed more easily than multiple individual files of thumbnail data for the digital asset.

These and other embodiments are discussed in more detail below.

As mentioned above, note that embodiments herein can include a configuration of one or more computerized devices, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product including a non-transitory computer-readable storage medium on which software instructions are encoded for subsequent execution. The instructions, when executed in a computerized device having a processor, program the processor to perform the operations disclosed herein. Such arrangements are typically provided as software, code, instructions, and/or other data (e.g., data structures) arranged or encoded on a computer readable storage medium such as an optical medium (e.g., CD-ROM), floppy disk, hard disk, memory stick, etc., or other a medium such as firmware or microcode in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, one particular embodiment of the present disclosure is directed to a computer program product that includes a computer readable storage medium having instructions stored thereon for management of thumbnail data. For example, in one embodiment, the instructions, when carried out by a processor of a respective computer device, cause the processor in a monitor resource to: receive a digital asset; generate multiple sets of thumbnail data based on the digital asset, each of the multiple sets of thumbnail data encoded to support display of a respective thumbnail rendition of the digital asset; and initiate storage of the multiple sets of thumbnail data in a unit of storage in a repository. The unit of storage allocated for storing the multiple sets of thumbnail data associated with the digital asset.

The ordering of the steps has been added for clarity sake. These steps can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein can be embodied strictly as a software program, as a hybrid of software and hardware, or as hardware alone such as within a processor, or within an operating system or a within a software application. Example embodiments of the invention may be implemented within products and/or software applications such as those manufactured by Adobe Systems Incorporated of San Jose, Calif., USA.

As discussed above, techniques herein are well suited for use in software and/or hardware applications that manage thumbnail data associated with one or more digital assets. However, it should be noted that embodiments herein are not limited to use in such applications and that the techniques discussed herein are well suited for other applications as well.

Additionally, although each of the different features, techniques, configurations, etc., herein may be discussed in different places of this disclosure, it is intended that each of the concepts can be executed independently of each other or, where suitable, in combination with each other. Accordingly, the one or more present inventions as described herein can be embodied and viewed in many different ways.

Also, note that this preliminary discussion of embodiments herein does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), and additional points of novelty, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

As discussed above, one embodiment herein includes a digital asset manager. The digital asset manager receives a digital asset. The digital asset manager generates multiple sets of thumbnail data based on the digital asset. Each of the multiple sets of thumbnail data can be encoded to support display of a different thumbnail resolution of the digital asset. The digital asset manager initiates storage of the multiple sets of thumbnail data in a unit of storage such as a file in a repository. The unit of storage can be pre-allocated for storing the multiple sets of thumbnail data associated with the digital asset. Accordingly, in lieu of storing data for each thumbnail in a different file as in conventional methods, configurations herein can include storing thumbnail data in the same unit of storage or file.

Figure 1:
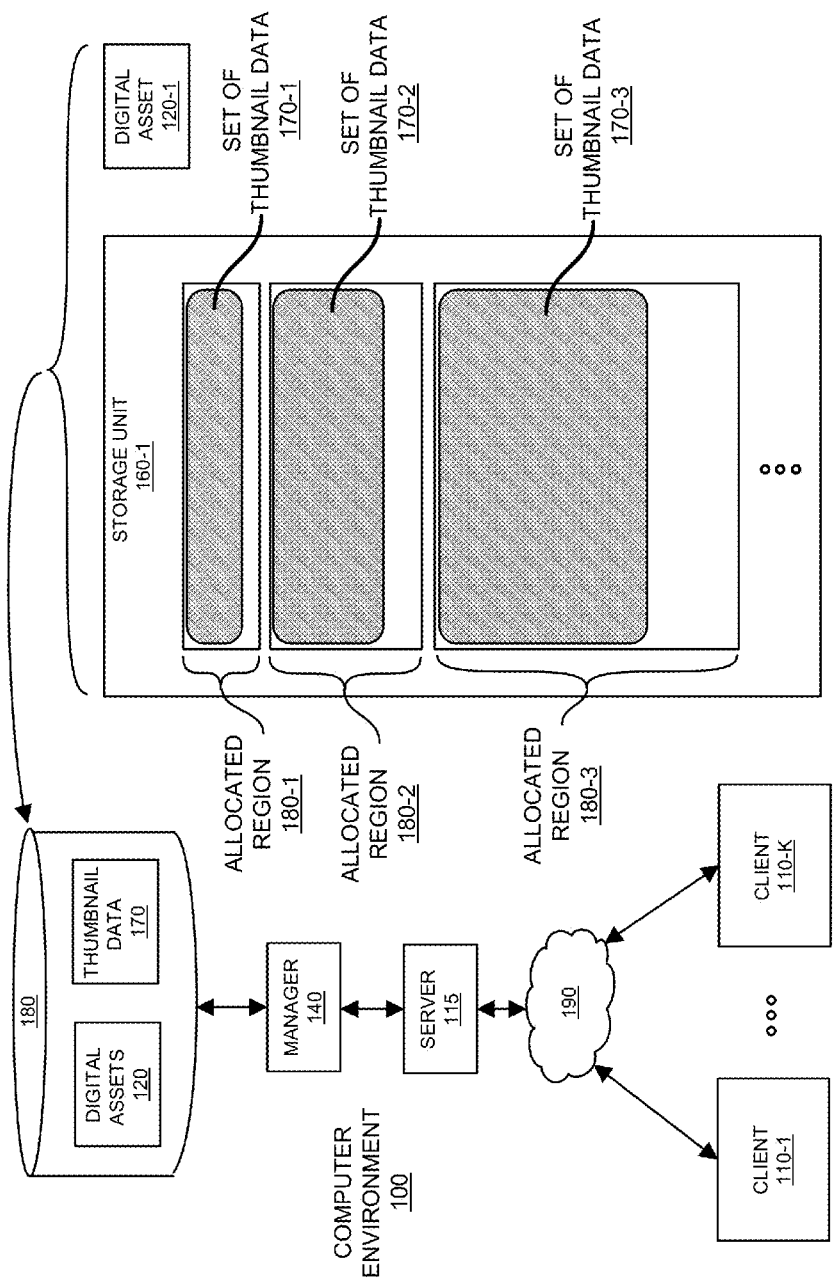
FIG. 1 is an example diagram of a computer environment including a digital asset manager according to embodiments herein.

FIG. 1 is an example diagram illustrating a computer environment 100 according to embodiments herein.

As shown, computer environment 100 includes clients 110 (e.g., client 110-1, . . . , client 110-K), network 190, server 115, repository 180, and digital asset manager 140.

Repository 180 can be configured to store one or more digital assets 120 and corresponding thumbnail data 170. The digital assets 120 can be any type of content that can be rendered on a display screen such as video, static images, etc.

As its name suggests, digital asset manager 140 manages the digital assets 120 and corresponding thumbnail data 170 stored in repository 180. As discussed below, one or more clients 110 uploads the digital assets 120 for storage in repository 180.

Computer environment 100 can be configured to enable sharing of content such as digital assets 120 amongst multiple clients 110. For example, each of clients 110 can upload digital assets through server 115 for storage of the digital assets in repository 180.

Subsequent to uploading, from a respective client 110, a new digital asset such as digital asset 120-1 over network 190 to server 115, server 115 forwards the received digital asset 120-1 to digital asset manager 140 for processing.

In one embodiment, the digital asset manager 140 derives thumbnail data 170 for the newly received digital asset. The thumbnail data enables rendering of the digital asset via one or more sets of thumbnail data.

Typically, the thumbnail data such as set of thumbnail data 170-1, set of thumbnail data 170-2, set of thumbnail data 170-3, etc., generated for a respective digital asset 120-1 includes less bit information and supports a lower resolution rendering of the original digital asset 120-1.

Note that the size of each digital asset can vary. For example, the size of a received digital asset can vary depending on the application.

The size of the thumbnail data for a respective image, video, etc., may vary as well. For example, the size of a respective digital asset as well as the thumbnail data generated by digital asset manager 140 for the digital asset may vary depending on variation in color amongst pixels in the image, resolution, etc.

A received digital asset may be encoded according to any suitable format such as a JPEG format, MPEG format, etc. Thus, the thumbnail data 170 generated by the digital asset manager 140 for the received digital asset can be generated in accordance with a JPEG encoding format, MPEG format, etc.

In one embodiment, each of the different sets of thumbnail data 170-1, 170-2, 170-3, etc., supports rendering of a lower resolution than a resolution of the digital asset 120-1. As an example, a client may wish to view a rendition of digital asset 120-1 without downloading the full resolution/size copy of the digital asset 120-1 stored in repository 180. In such an embodiment, the client can view a rendition of a digital asset based on thumbnail data of the original digital asset.

In one embodiment, each of the different sets of thumbnail data 170-1, 170-2, 170-3, etc., can support display of a different sized/resolution thumbnail rendition of the original digital asset 120-1.

Thumbnail data 170 and/or corresponding digital asset 120 can be decoded by a respective decoder at the clients to render an image, video, etc., associated with the digital asset.

By way of a non-limiting example, set of thumbnail data 170-1 may support rendering of a 8×8 pixel version of the digital asset 120-1, set of thumbnail data 170-2 may support rendering of a 16×16 pixel version of the digital asset 120-1, set of thumbnail data 170-1 may support rendering of a 32×32 pixel version of the digital asset 120-1, etc. Accordingly, the thumbnail data for a respective digital asset 120 stored in repository 180 can enable compact viewing of content without having to retrieve the original digital asset 120-1, which may be large in size and require a long time to retrieve.

If desired, after viewing a respective thumbnail version of a digital asset, the client can initiate retrieval of the original digital asset 120 (e.g., via clicking on a rendered thumbnail) from repository 180 for rendering and viewing the original digital asset on a respective display screen.

In contrast to conventional techniques, the digital asset manager 140 can be configured to store the sets of thumbnail data 170 in a allocated portion of repository such as a storage unit 160-1.

By way of a non-limiting example, the storage unit 160-1 can be a file, table, or other suitable partitioning of repository 180 to store information. The files of thumbnail data such as thumbnail data 170-1, thumbnail data 170-2, etc. can be stored in a folder associated with digital asset 120-1.

The storage unit 160-1 or file can be partitioned to include multiple allocated regions 180 for storing different sized sets of thumbnail data 170. For example, allocated region 180-1 of storage unit 160-1 can be configured to store set of thumbnail data 170-1; allocated region 180-2 of storage unit 160-1 can be configured to store set of thumbnail data 170-2; allocated region 180-3 of storage unit 160-1 can be configured to store set of thumbnail data 170-3; and so on.

Each allocated region 180 in storage unit 160-1 may be larger in size than is required to store a respective set of thumbnail data. For example, as mentioned above, the bit-size of a respective digital asset and corresponding thumbnail data may vary depending on the captured content.

Even though the size of a digital asset and corresponding thumbnail data may vary in size, each allocated region 180 in repository 180 may be of a predetermined size.

As shown in FIG. 1, the set of thumbnail data 170-1 generated by the digital asset manager 140 for digital asset 120-1 occupies less than all of the bit space in allocated region 180-1; the set of thumbnail data 170-2 generated by the digital asset manager 140 for digital asset 120-1 occupies less than all of the bit space in allocated region 180-2; the set of thumbnail data 170-3 generated by the digital asset manager 140 for digital asset 120-1 occupies less than all of the bit space in allocated region 180-3; and so on.

By way of a non-limiting example, the allocated region 180-1 of the storage unit 160-1 may be 100 kilobytes in size; the allocated region 180-2 of the storage unit 160-1 may be 500 kilobytes in size; the allocated region 180-1 of the storage unit 160-1 may be 2 Megabytes in size; and so on.

Accordingly, a file for storing thumbnail data can be partitioned into multiple allocated regions, each being of a different size.

Also, by way of a non-limiting example, note that the allocated portions of one or more respective storage units or files in repository can be ordered from smaller to larger. For example, the allocated region 180-1 of a respective file can store smallest sized packages of thumbnail data; the allocated region 180-2 of a respective file can store a next larger sized package of thumbnail data; the allocated region 180-3 of a respective file can store a next larger sized package of thumbnail data; and so on.

Depending on security settings, each of the clients 110 or other resources can have access to all or a portion of the digital assets 120 and/or respective thumbnail data 170 stored in repository 180.

In one embodiment, clients 110 provide input as to which of their digital assets can be distributed over network 190 to different requesting resources.

To render content such as an original digital asset or corresponding thumbnail data associated with a digital asset, each of the clients 110 can include a computer system, media player, and respective display screen. The computer system enables access to information stored in repository 180 and displays one or more digital assets 120 retrieved from repository 180.

In one embodiment, to retrieve a digital asset and/or thumbnail data associated with the digital asset, a respective client 110 communicates over network with server 115. The server 115 can be configured to determine whether a respective requesting client has been authorized to retrieve requested content.

Assuming that a client 110 is authorized, the server 115 initiates retrieval of a digital asset and/or thumbnail data from repository 180 and serves such data to the client. Subsequent to retrieval of an asset, the media player associated with a client 110 renders a respective image, video, etc., based on the retrieved digital asset and/or thumbnail data.

Figure 2:
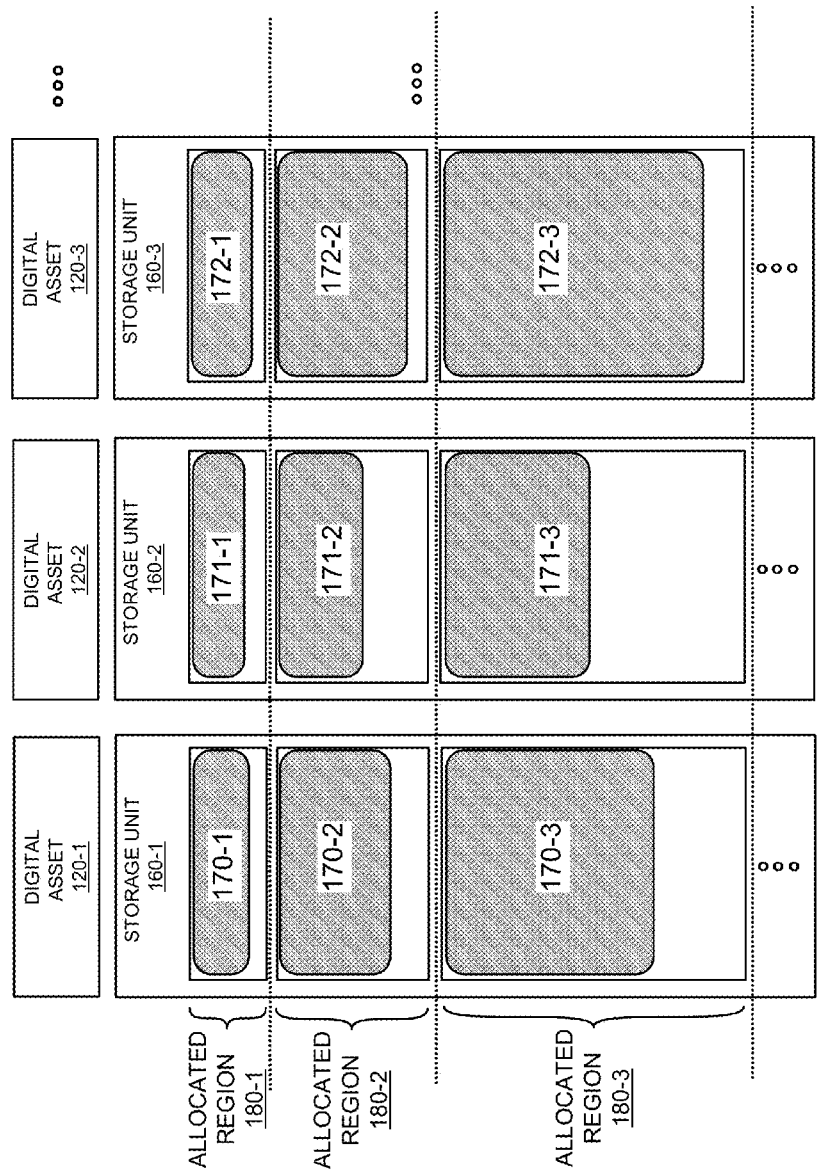
FIG. 2 is an example diagram illustrating management of digital assets according to embodiments herein.

FIG. 2 is an example diagram illustrating multiple storage units in a repository for storing digital assets and corresponding thumbnail data according to embodiments herein.

As previously discussed, the digital asset manager 140 generates the thumbnail data for each received digital asset 120-1, 120-2, 120-3, and so on.

The repository 180 can be configured to include multiple storage units such as multiple files to store respective thumbnail data generated by digital asset manager 140. For example, repository 180 can include storage unit 160-1, storage unit 160-2, storage unit 160-3, etc.

Storage unit 160-1 such as a first file stores thumbnail data 170 as generated by digital asset manager 140 for digital asset 120-1; storage unit 160-2 such as a second file stores thumbnail data 171 as generated by digital asset manager 140 for digital asset 120-2; storage unit 160-3 such as a third file stores thumbnail data 172 as generated by digital asset manager 140 for digital asset 120-3; and so on.

More specifically, storage unit 160-1 includes allocated region 180-1 to store thumbnail data 170-1 associated with digital asset 120-1; storage unit 160-1 includes allocated region 180-2 to store thumbnail data 170-2 associated with digital asset 120-1; storage unit 160-1 includes allocated region 180-3 to store thumbnail data 170-3 associated with digital asset 120-1; and so on.

Storage unit 160-2 includes allocated region 180-1 to store thumbnail data 171-1 associated with digital asset 120-2; storage unit 160-2 includes allocated region 180-2 to store thumbnail data 171-2 associated with digital asset 120-2; storage unit 160-2 includes allocated region 180-3 to store thumbnail data 171-3 associated with digital asset 120-2; and so on.

Storage unit 160-3 includes allocated region 180-1 to store thumbnail data 172-1 associated with digital asset 120-3; storage unit 160-3 includes allocated region 180-2 to store thumbnail data 172-2 associated with digital asset 120-3; storage unit 160-3 includes allocated region 180-3 to store thumbnail data 172-3 associated with digital asset 120-3; and so on.

As shown, the shaded region of a respective allocated region indicates a relative size of the thumbnail data stored in comparison to the size of the allocated region.

Note that FIG. 2 illustrates the variability of the size of thumbnail data generated for each digital asset. For example, of the thumbnail data shown, thumbnail data 171 occupies the least amount of a respective allocated region 180 for the storage units shown. Thumbnail data 172 occupies the most amount of a respective allocated region 180 for the storage units shown.

Storage of the thumbnail data as shown in FIG. 2 may not provide highest possible storage efficiency because a portion of each of the allocated regions may not store any thumbnail data. However, storage of thumbnail data in the partitioned files or storage units 160 as in FIG. 3 reduces a complexity associated with identifying a particular location in a file where the thumbnail data is stored. For example, the partitions for each of the allocated regions are the same size for each file. Thus, it is known, a priori, of an offset location in the file as well as a maximum size of the thumbnail data that resides in a respective allocated region of the file.

Embodiments herein are useful over conventional methods. For example, when a digital asset is modified or deleted, the digital asset manager 140 can easily update (e.g., modify or delete) the corresponding thumbnail data stored in a single affected file (storing multiple sets of thumbnail data) in the repository 180 rather than update multiple individual files storing the different thumbnail data for a digital asset.

During operation, note that the server 115 can receive communications from clients or other resources for thumbnail data. The communications can request all of the thumbnail data for a respective digital asset. In such an instance, the server 115 can initiate retrieval and transmission of a file such as storage unit 160-1 to a requesting resource. Accordingly, a requesting client can receive a file including all of the thumbnail data associated with a respective digital asset.

In other embodiments, the server 115 and/or digital asset manager 140 can identify a particular size or type of thumbnail data as specified in a request from a remote resource over network 190. In this latter instance, the server 115 can retrieve the appropriate one or more sets of thumbnail data from the file as specified by the request and transmit such thumbnail data to the client in lieu of transmitting the whole file including all of the thumbnail data.

As previously discussed, the server 115 and/or other resource can easily identify where the thumbnail data is stored in the file because of the common partitioning of each of multiple files used to store the thumbnail data.

Figure 3:
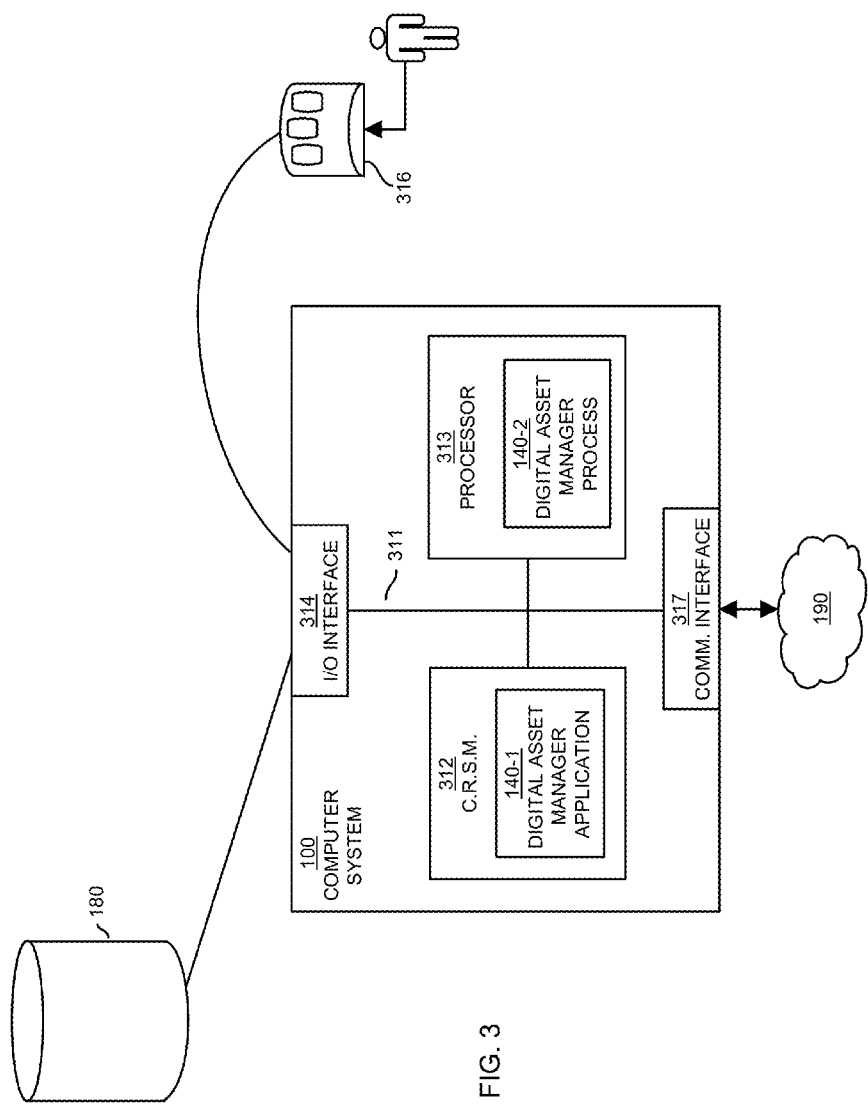
FIG. 3 is a diagram illustrating an example computer architecture for executing a digital asset manager according to embodiments herein.

FIG. 3 is an example block diagram of a computer system for executing digital asset manager 140 according to embodiments herein.

Computer system 300 can include one or more computerized devices such as a personal computer, workstation, portable computing device, console, network terminal, processing device, network device, etc., operating as a server, client, etc.

Note that the following discussion provides a basic embodiment indicating how to carry out digital asset management according to embodiments herein. However, it should be noted that the actual configuration for carrying out the operations as described herein can vary depending on a respective application.

As shown, computer system 300 of the present example includes an interconnect 311 that couples computer readable storage media 312 such as a non-transitory type of media in which digital information can be stored and retrieved, a processor 313, I/O interface 314, and a communications interface 317.

I/O interface 314 provides connectivity to repository 180 and, if present, other devices such as display screen, peripheral devices 316, keyboard, computer mouse, etc.

Computer readable storage medium 312 can be any suitable device such as memory, optical storage, hard drive, floppy disk, etc. In one embodiment, the computer readable storage medium 312 is a non-transitory storage media to store data such as software program 110.

Communications interface 317 enables computer environment 100 to communicate over network 190 to retrieve information from remote sources and communicate with other computers. I/O interface 314 enables processor 313 to retrieve or attempt retrieval of stored information from repository 180.

As shown, computer readable storage media 312 can be encoded with software, firmware, etc., executed by processor 313.

During operation of one embodiment, processor 313 accesses computer readable storage media 312 via the use of interconnect 311 in order to launch, run, execute, interpret or otherwise perform the instructions of digital asset manager application 140-1 stored in computer readable storage medium 312.

Execution of the digital asset manager application 140-1 produces processing functionality such as digital asset manager process 140-2 in processor 313. In other words, the digital asset manager process 140-2 associated with processor 313 represents one or more aspects of executing digital asset manager application 140-1 within or upon the processor 313 in the computer system 300.

Those skilled in the art will understand that the computer system 300 can include other processes and/or software and hardware components, such as an operating system that controls allocation and use of hardware resources to execute digital asset manager application 140-1.

In accordance with different embodiments, note that computer system may be any of various types of devices, including, but not limited to, a personal computer system, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device.

Functionality supported by resources in computer environment 100 and digital asset manager 140 will now be discussed via flowcharts in FIGS. 4-9. As discussed above, the digital asset manager 140 can be configured to execute the steps in the flowcharts as discussed below.

Note that there will be some overlap with respect to concepts discussed above for FIGS. 1 through 3. Also, note that the steps in the below flowcharts need not always be executed in the order shown. The steps can be executed in any suitable order.

Figure 4:
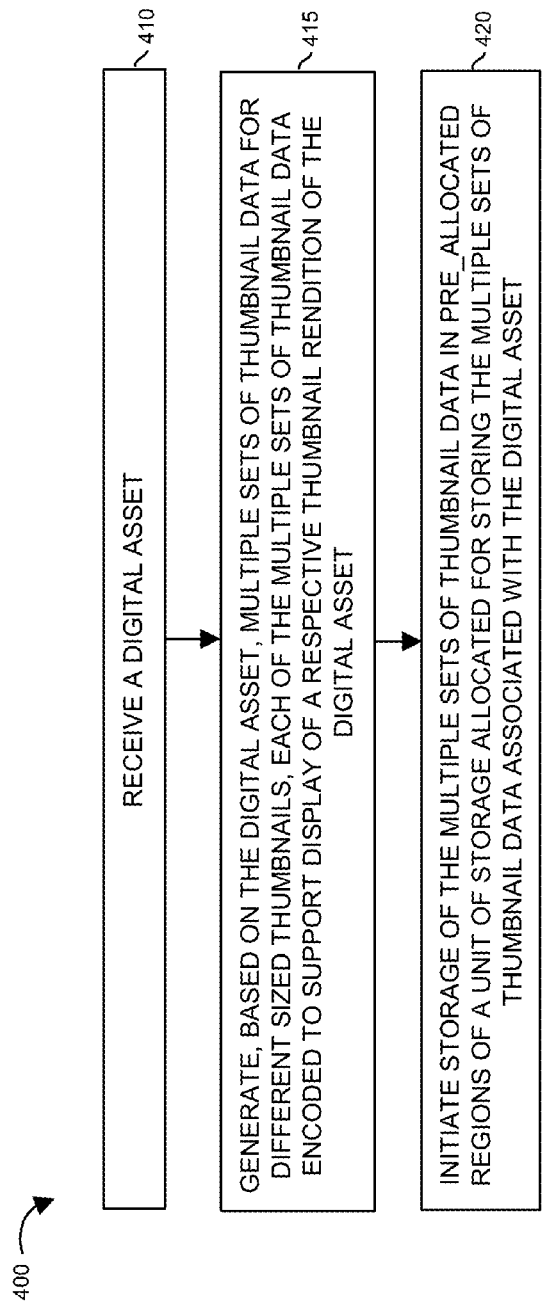
FIG. 4 is a flowchart illustrating an example method of managing one or more digital assets according to embodiments herein.

FIG. 4 is a flowchart 400 illustrating a general technique of managing thumbnail data according to embodiments herein.

In step 410, the digital asset manager 140 receives a digital asset.

In step 415, the digital asset manager 140 generates, based on the received digital asset, multiple sets of thumbnail data 170 for different sized thumbnails. Each of the multiple sets of thumbnail data 170 can be encoded to support display of a respective thumbnail rendition of the received digital asset.

In step 420, the digital asset manager 140 initiates storage of the multiple sets of thumbnail data 170 in pre-allocated regions of a unit of storage. The unit of storage can be a resource such as a file having pre-allocated regions for storing the multiple sets of thumbnail data 170 associated with the received digital asset.

Figure 5:
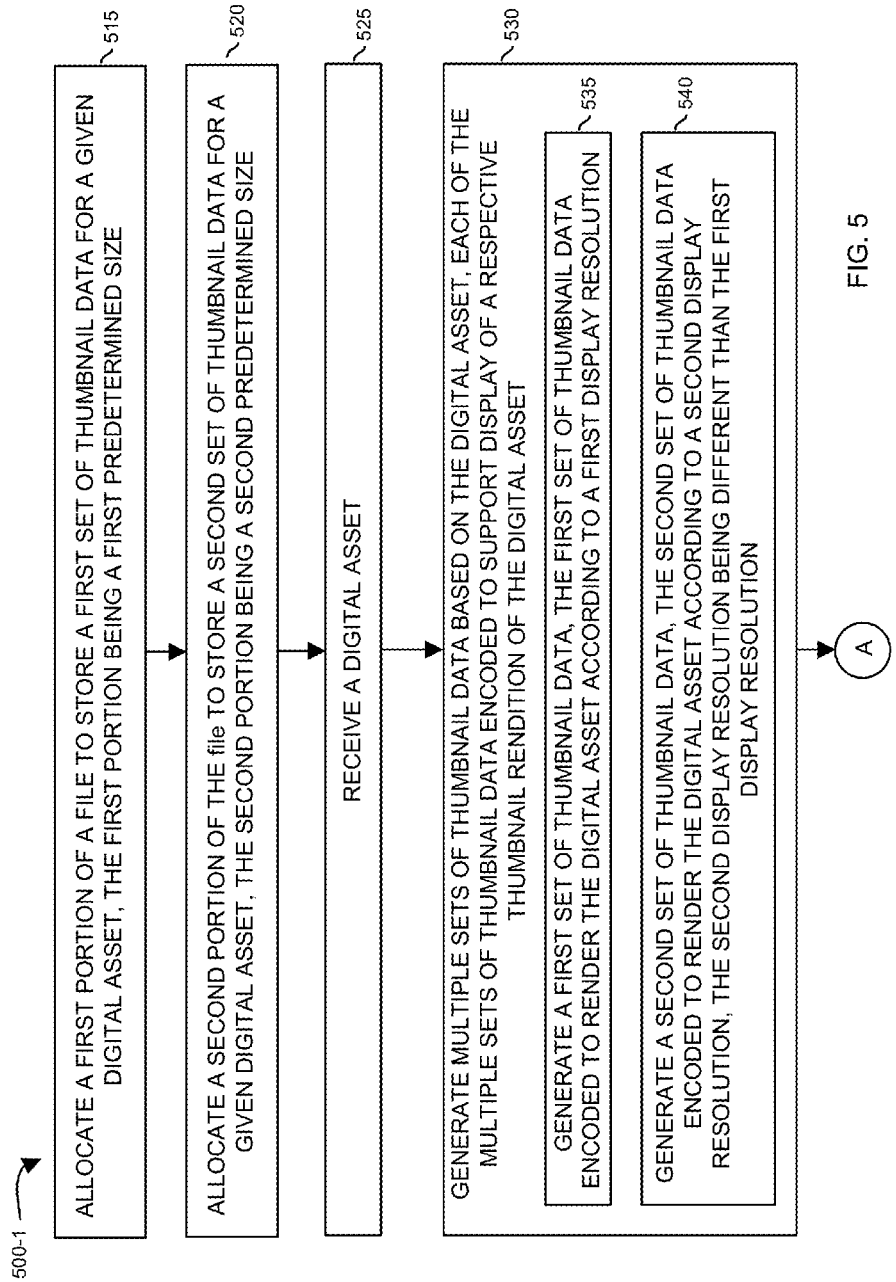
FIGS. 5 and 6 combine to form a flowchart illustrating an example method of managing one or more digital assets according to embodiments herein.
Figure 6:
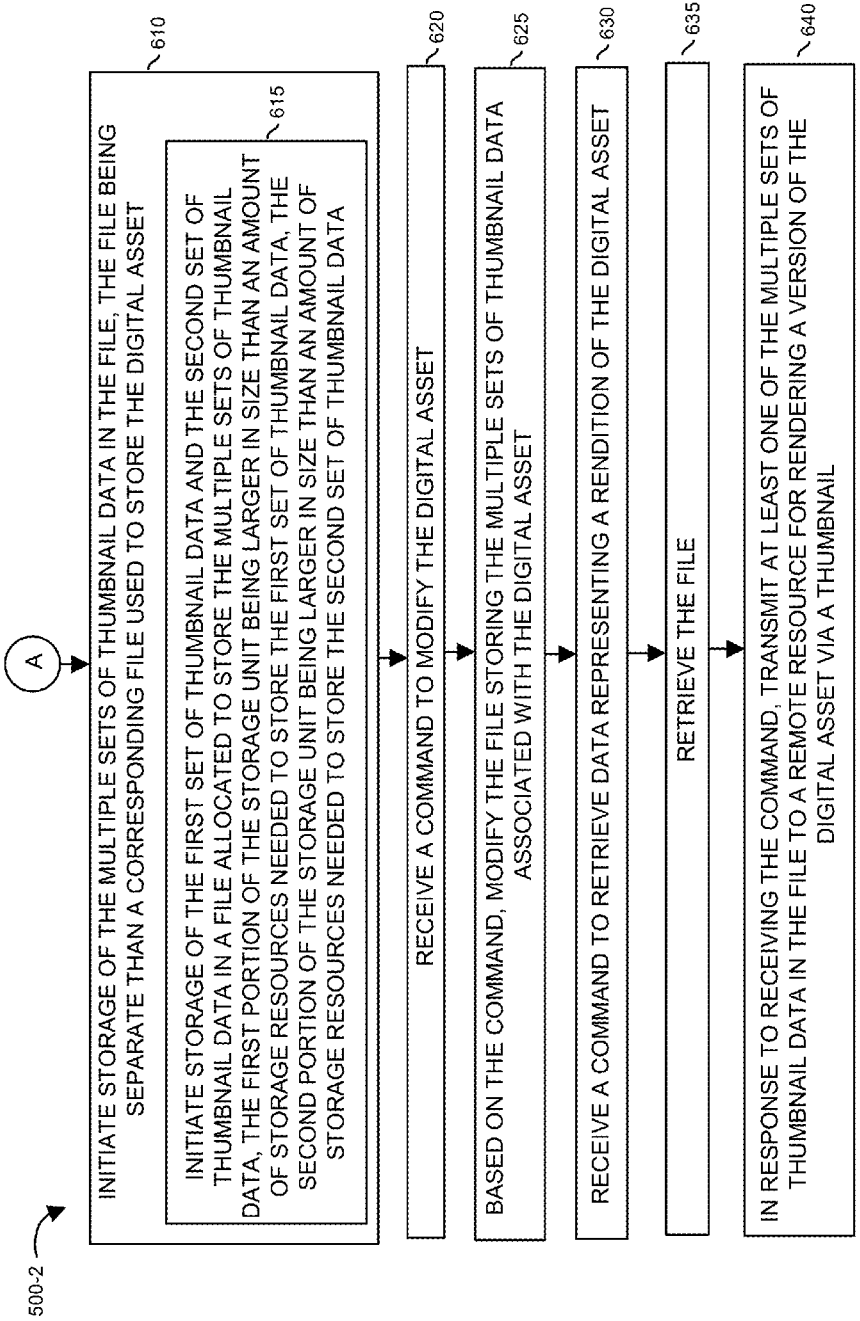

FIGS. 5 and 6 combine to form a flowchart 500 (e.g., flowchart 500-1 and flowchart 500-2) illustrating management of digital assets and thumbnail data according to embodiments herein.

In step 515, the digital asset manager 140 allocates a first portion (e.g., allocated region 180-1) of a file to store a first set of thumbnail data for a given digital asset, the first portion of the file being a first predetermined size.

In step 520, the digital asset manager 140 allocates a second portion (e.g., allocated region 180-2) of the file to store a second set of thumbnail data for the given digital asset, the second portion being a second predetermined size.

In step 525, assume that the digital asset manager 140 receives a digital asset.

In step 530, the digital asset manager 140 generates multiple sets of thumbnail data based on the received digital asset. Each of the multiple sets of thumbnail data generated by the digital asset manager 140 can be encoded in any suitable playback format to support display of a respective thumbnail rendition of the received digital asset.

In sub-step 535, the digital asset manager 140 generates a first set of thumbnail data, the first set of thumbnail data encoded to render the digital asset according to a first display resolution.

In sub-step 540, the digital asset manager 140 generates a second set of thumbnail data. The second set of thumbnail data can be encoded to render the digital asset according to a second display resolution, the second display resolution being different than the first display resolution.

In following step 610 of flowchart 500-2 of FIG. 6, the digital asset manager 140 initiates storage of the multiple sets of thumbnail data in the file. As previously discussed, the file or storage unit for storing the thumbnail data can be distinct from a corresponding file or storage unit used to store the original digital asset. Thus, a first file can store the originally received digital asset and a second file can store the thumbnail data generated for the original digital asset.

In sub-step 615, the digital asset manager 140 initiates storage of the first set of thumbnail data and the second set of thumbnail data in a file allocated to store the multiple sets of thumbnail data. The first portion of the storage unit or file can be larger in size than an amount of storage resources needed to store the first set of thumbnail data. The second portion of the storage unit or file can be larger in size than an amount of storage resources needed to store the second set of thumbnail data.

In step 620, the digital asset manager 140 receives a command to modify the stored digital asset.

In step 625, based on the command, the digital asset manager 140 modifies the file storing the multiple sets of thumbnail data associated with the digital asset. Accordingly, the file of thumbnail data can be updated to be consistent with the corresponding digital asset.

In step 630, the digital asset manager 140 receives a command to retrieve data representing a rendition of the digital asset.

In step 635, the digital asset manager 140 retrieves the file.

In step 640, in response to receiving the command, the digital asset manager 140 transmits at least one of the multiple sets of thumbnail data in the file to a remote resource for rendering a version of the digital asset via a thumbnail. As previously discussed, the digital asset manager 140 and/or server can initiate forwarding of one or more sets of the thumbnail data for a digital asset over network 190 to a remote client.

Figure 7:
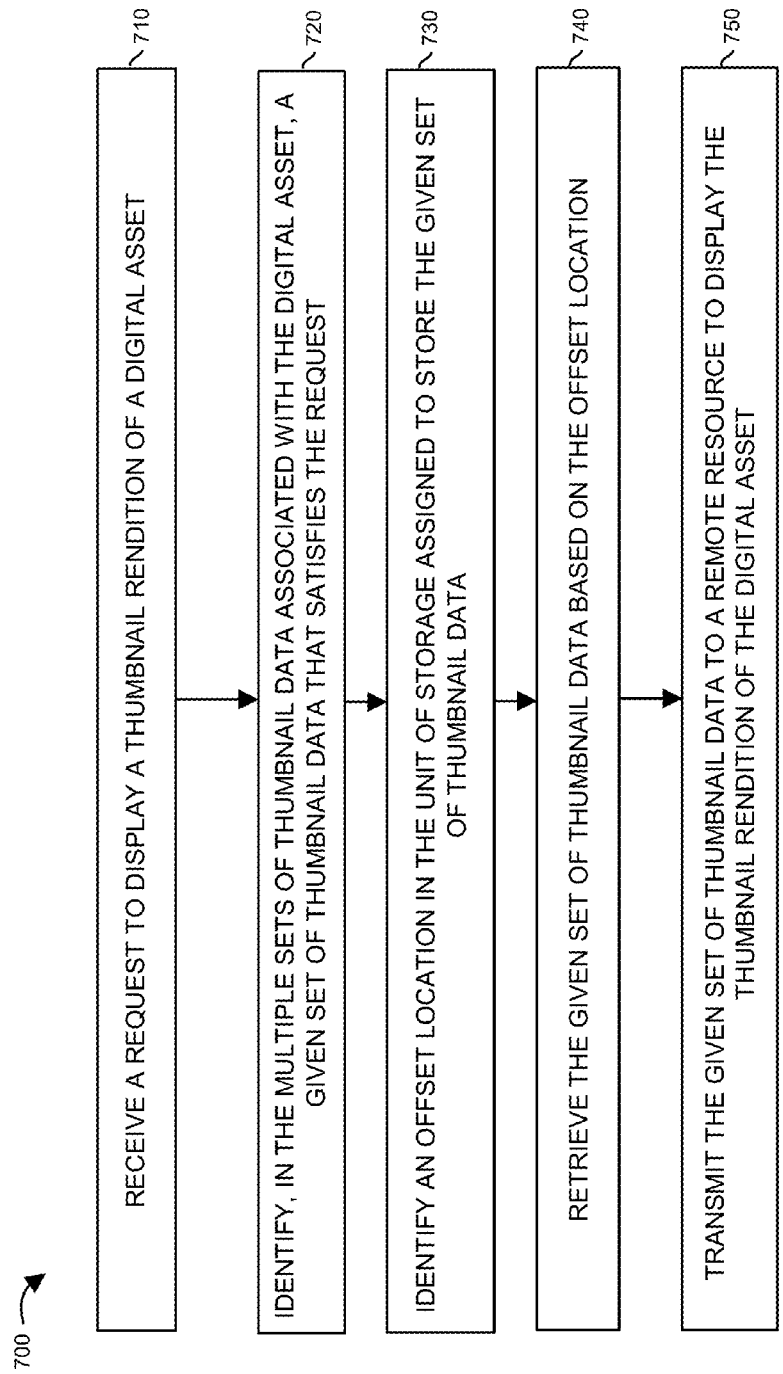
FIG. 7 is a flowchart illustrating an example method of managing one or more digital assets according to embodiments herein.

FIG. 7 is a flowchart 700 illustrating management of thumbnail data for one or more digital asset according to embodiments herein.

In step 710, the digital asset manager 140 receives a request for a thumbnail rendition of a digital asset.

In step 720, the digital asset manager 140 identifies, in the multiple sets of thumbnail data associated with the digital asset, a given set of thumbnail data that satisfies the request.

In step 730, the digital asset manager 140 identifies, based on partitioning of allocated regions, an offset location in the unit of storage assigned to store the given set of thumbnail data.

In step 740, the digital asset manager 140 retrieves the given set of thumbnail data based on the identified offset location.

In step 750, the digital asset manager 140 and/or server 115 transmits the given set of thumbnail data to a remote resource for display of the thumbnail rendition of the digital asset.

Figure 8:
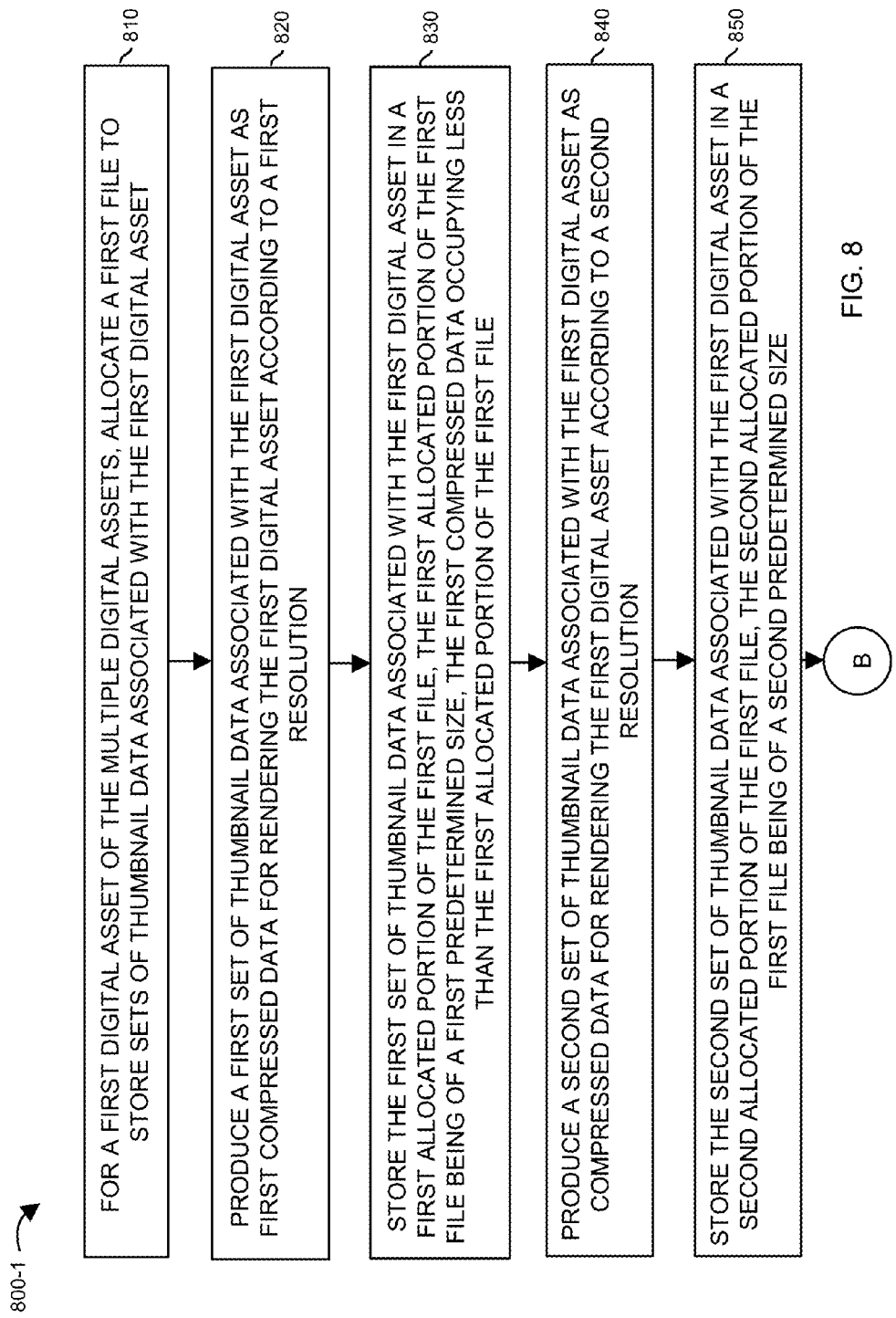
FIGS. 8 and 9 combine to form a flowchart illustrating an example method of initiating execution of instructions to handle a fault according to embodiments herein.
Figure 9:
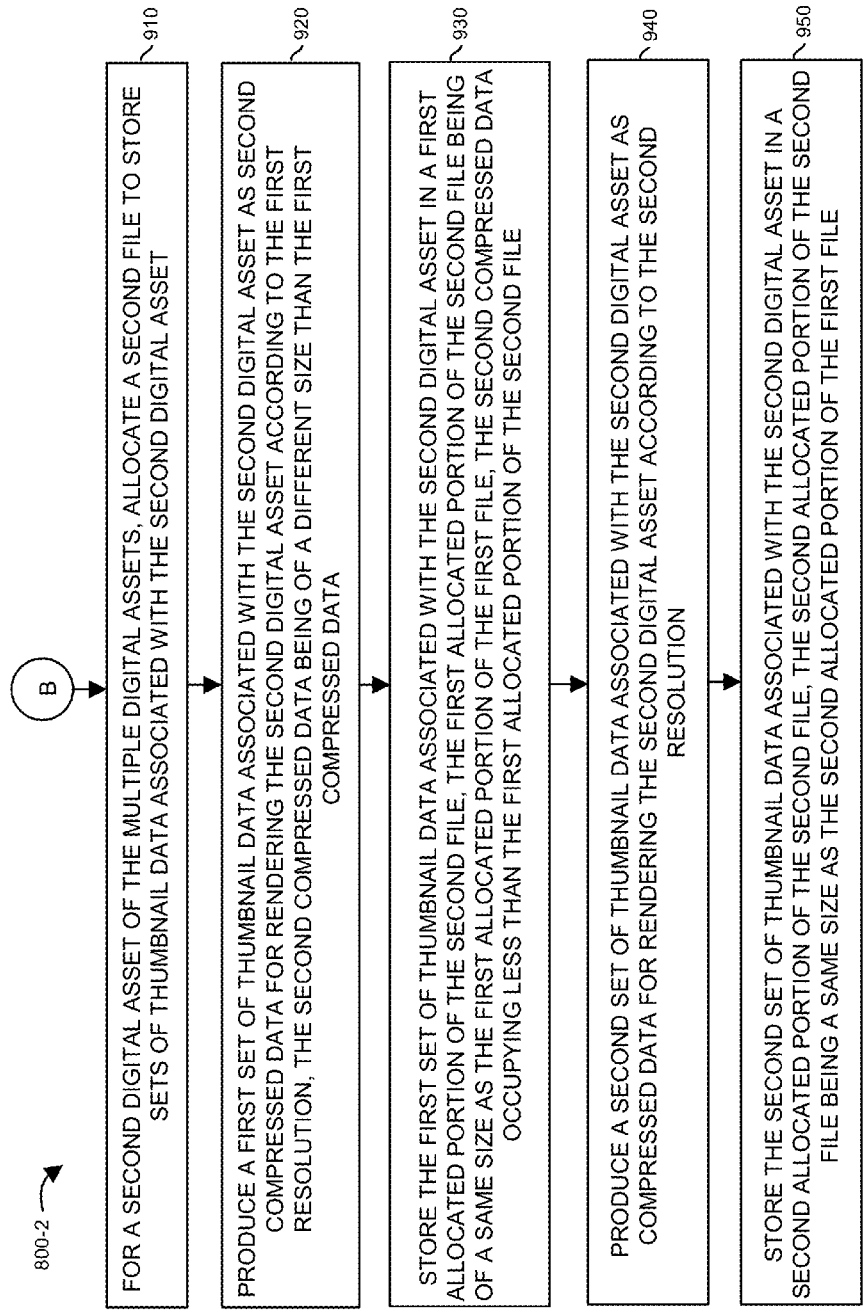

FIGS. 8 and 9 combine to form a flowchart 800 (e.g., flowchart 800-1 and flowchart 800-2) illustrating management of digital assets according to embodiments herein.

In step 810, for a first digital asset of multiple digital assets, the digital asset manager 140 allocates a first file to store sets of thumbnail data associated with the first digital asset.

In step 820, the digital asset manager 140 produces a first set of thumbnail data associated with the first digital asset as first compressed data for rendering the first digital asset according to a first resolution, size, etc.

In step 830, the digital asset manager 140 stores the first set of thumbnail data associated with the first digital asset in a first allocated portion of the first file, the first allocated portion of the first file being of a first predetermined size, the first compressed data occupying less than the first allocated portion of the first file.

In step 840, the digital asset manager 140 produces a second set of thumbnail data associated with the first digital asset as compressed data for rendering the first digital asset according to a second resolution, size, etc.

In step 850, the digital asset manager 140 stores the second set of thumbnail data associated with the first digital asset in a second allocated portion of the first file, the second allocated portion of the first file being of a second predetermined size.

In step 910 of flowchart 800-2 in FIG. 9, for a second digital asset of the multiple digital assets, the digital asset manager 140 allocates a second file to store sets of thumbnail data associated with the second digital asset.

In step 920, the digital asset manager 140 produces a first set of thumbnail data associated with the second digital asset as second compressed data for rendering the second digital asset according to the first resolution, the second compressed data being of a different size than the first compressed data.

In step 930, the digital asset manager 140 stores the first set of thumbnail data associated with the second digital asset in a first allocated portion of the second file, the first allocated portion of the second file being of a same size as the first allocated portion of the first file, the second compressed data occupying less than the first allocated portion of the second file.

In step 940, the digital asset manager 140 produces a second set of thumbnail data associated with the second digital asset as compressed data for rendering the second digital asset according to the second resolution.

In step 950, the digital asset manager 140 stores the second set of thumbnail data associated with the second digital asset in a second allocated portion of the second file, the second allocated portion of the second file being of a same size as the second allocated portion of the first file.

Note again that techniques herein are well suited for management of thumbnail data associated with one or more digital assets. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A method comprising:
receiving a digital asset;
generating, based on the digital asset, multiple sets of thumbnail data for different sized thumbnails, each of the multiple sets of thumbnail data encoded to support display of a respective thumbnail rendition of the digital asset at a different respective thumbnail resolution; and
storing the multiple sets of thumbnail data in a thumbnail file stored as a single unit of storage partitioned into preallocated regions,
each preallocated region having a different respective size,
the size of each preallocated region corresponding to a maximum size of thumbnail data that can reside therein,
wherein multiple thumbnail files are created for multiple digital assets by partitioning each of the multiple thumbnail files into the preallocated regions, wherein common offset locations in each of the respective thumbnail files identify where thumbnail data supporting particular thumbnail resolutions are stored; and
wherein, when the thumbnail file is used by a recipient device, the recipient device retrieves thumbnail data supporting a thumbnail resolution of interest by identifying an offset location of a preallocated region in the thumbnail file corresponding to the thumbnail resolution of interest.

2. The method as in claim 1 further comprising:
initiating storage of at least a portion of the digital asset in a second file, the second file corresponding to a second unit of storage allocated to store the digital asset.

3. The method as in claim 1 further comprising:
receiving a command to modify the digital asset;
in response to receiving the command, modifying the digital asset and the multiple sets of thumbnail data based on the modified digital asset; and
updating the file to store the modified multiple sets of thumbnail data and the modified digital asset.

4. The method as in claim 1 further comprising:
receiving a command to retrieve data representing a rendition of the digital asset;
determining at least one of the multiple sets of thumbnail data in the file that corresponds to the data representing the rendition of the digital asset;
identifying the pre-allocated region of the file that includes the determined at least one of the multiple sets of thumbnail data; and
transmitting the at least one of the multiple sets of thumbnail data in the file to a remote resource for rendering a version of the digital asset via a thumbnail.

5. The method as in claim 1, wherein the generating the multiple sets of thumbnail data based on the digital asset comprises:

generating a first set of thumbnail data, the first set of thumbnail data encoded to render the digital asset according to a first display resolution; and generating a second set of thumbnail data, the second set of thumbnail data encoded to render the digital asset according to a second display resolution, the second display resolution being different than the first display resolution.

6. The method as in claim 5 further comprising:

allocating a first portion of the single unit of storage to store the first set of thumbnail data, the first portion being a first predetermined size; and allocating a second portion of the single unit of storage to store the second set of thumbnail data, the second portion being a second predetermined size.

7. The method as in claim 6, wherein storing the multiple sets of thumbnail data in a thumbnail file stored as a single unit of storage partitioned into preallocated regions comprises:

initiating storage of the first set of thumbnail data and the second set of thumbnail data in the single unit of storage allocated to store the multiple sets of thumbnail data, the first portion of the single unit of storage being larger in size than an amount of storage resources needed to store the first set of thumbnail data, the second portion of the single unit of storage being larger in size than an amount of storage resources needed to store the second set of thumbnail data.

8. The method as in claim 1 further comprising:

in response to receiving a command, initiating distribution of the multiple sets of thumbnail data stored in the single unit of storage.

9. The method as in claim 1 further comprising:

receiving a request to display a thumbnail rendition of the digital asset;

identifying, in the multiple sets of thumbnail data, a given set of thumbnail data that satisfies the request;

identifying a second offset location in the single unit of storage assigned to store the given set of thumbnail data;

retrieving the given set of thumbnail data based on the second offset location; and transmitting the given set of thumbnail data to a remote resource to display the thumbnail rendition of the digital asset.

10. The method as in claim 1 further comprising:

for a first digital asset of the multiple digital assets, allocating a first file to store the multiple sets of thumbnail data associated with the first digital asset, the first file corresponding to the single unit of storage;

storing a first set of the multiple sets of thumbnail data associated with the first digital asset in a first allocated portion of the first file, the first allocated portion of the first file being of a first predetermined size;

storing a second set of the multiple sets of thumbnail data associated with the first digital asset in a second allocated portion of the first file, the second allocated portion of the first file being of a second predetermined size;

for a second digital asset of the multiple digital assets, allocating a second file to store the multiple sets of thumbnail data associated with the second digital asset, the second file corresponding to a second single unit of storage;

storing a first set of the multiple sets of thumbnail data associated with the second digital asset in a first allocated portion of the second file, the first allocated portion of the second file being a same size as the first allocated portion of the first file; and storing a second set of the multiple sets of thumbnail data associated with the second digital asset in a second allocated portion of the second file, the second allocated portion of the second file being a same size as the second allocated portion of the first file.

11. The method as in claim 10 further comprising:

ordering the allocated portions in the first file and second file from smaller to larger.

12. The method as in claim 10 further comprising:

producing the first set of thumbnail data associated with the first digital asset as first compressed data for rendering the first digital asset according to a first resolution, the first compressed data occupying less than the first allocated portion of the first file; and producing the first set of thumbnail data associated with the second digital asset as second compressed data for rendering the second digital asset according to the first resolution, the second compressed data being of a different size than the first compressed data, the second compressed data occupying less than the first allocated portion of the second file.

13. The method of claim 1, further comprising:

providing a set of thumbnail data of the multiple sets of thumbnail data, upon receiving a request to provide the set of thumbnail data, by determining the pre-allocated region in the single unit of storage where the requested set of thumbnail data is stored.

14. A computer system comprising:

a processor;

a memory unit that stores instructions associated with an application executed by the processor; and an interconnect coupling the processor and the memory unit, enabling the computer system to execute the application and perform operations of:

receiving a digital asset;

generating, based on the digital asset, multiple sets of thumbnail data for different sized thumbnails, each of the multiple sets of thumbnail data encoded to support display of a respective thumbnail rendition of the digital asset at a different respective thumbnail resolution;

storing the multiple sets of thumbnail data in a thumbnail file stored as a single unit of storage partitioned into preallocated regions, each preallocated region having a different respective size, the size of each preallocated region corresponding to a maximum size of thumbnail data that can reside therein, wherein multiple thumbnail files are created for multiple digital assets by partitioning each of the multiple thumbnail files into the preallocated regions, wherein common offset locations in each of the respective thumbnail files identify where thumbnail data supporting particular thumbnail resolutions are stored; and wherein, when the thumbnail file is used by a recipient device, the recipient device retrieves thumbnail data supporting a thumbnail resolution of interest by identifying an offset location of a preallocated region in the thumbnail file corresponding to the thumbnail resolution of interest.

15. A method comprising:
receiving, by a device comprising a processor, a thumbnail file for a digital asset, the thumbnail file having been created by:
  generating multiple sets of thumbnail data for the digital asset, each of the multiple sets of thumbnail data encoded to support display of a respective thumbnail rendition of the digital asset at a different respective thumbnail resolution; and
  storing the multiple sets of thumbnail data in the thumbnail file stored as a single unit of storage partitioned into preallocated regions, each preallocated region having a different respective size, the size of each preallocated region corresponding to a maximum size of thumbnail data that can reside therein;
retrieving, by the device, thumbnail data supporting a thumbnail resolution of interest by identifying an offset location of a preallocated region in the thumbnail file corresponding to the thumbnail resolution of interest; and
displaying or processing the thumbnail data by the device.

* * * * *